United States Patent
Harik et al.

(10) Patent No.: US 7,958,192 B2
(45) Date of Patent: Jun. 7, 2011

(54) METHOD FOR INFORMATION GATHERING AND DISSEMINATION IN A SOCIAL NETWORK

(76) Inventors: Ralph Harik, Palo Alto, CA (US); Georges Harik, Palo Alto, CA (US); Praveen Krishnamurthy, Mountain View, CA (US)

( * ) Notice: Subject to any disclaimer, the term of this patent is extended or adjusted under 35 U.S.C. 154(b) by 1037 days.

(21) Appl. No.: 11/740,202

(22) Filed: Apr. 25, 2007

(65) Prior Publication Data
US 2007/0266097 A1 Nov. 15, 2007

Related U.S. Application Data

(60) Provisional application No. 60/795,137, filed on Apr. 25, 2006.

(51) Int. Cl.
*G06F 15/16* (2006.01)
(52) U.S. Cl. .......................................... 709/204; 709/206
(58) Field of Classification Search ................... 709/204, 709/206
See application file for complete search history.

(56) References Cited

U.S. PATENT DOCUMENTS

| | | |
|---|---|---|
| 7,006,881 B1 | 2/2006 | Hoffberg et al. |
| 2002/0169644 A1 | 11/2002 | Greene |
| 2003/0028585 A1 | 2/2003 | Yeager et al. |
| 2005/0086300 A1* | 4/2005 | Yeager et al. .................. 709/204 |
| 2009/0070228 A1* | 3/2009 | Ronen .............................. 705/26 |
| 2009/0210480 A1* | 8/2009 | Sivasubramaniam et al. .............................. 709/203 |
| 2009/0287687 A1* | 11/2009 | Martire et al. ..................... 707/5 |

OTHER PUBLICATIONS

PCT International Search Report for International Application No. PCT/US2007/067436 dated Nov. 24, 2008, 2 pages.
PCT Written Opinion of the International Searching Authority for International Application No. PCT/US2007/067436 dated Nov. 24, 2008, 5 pages.

* cited by examiner

*Primary Examiner* — Mohamed Wasel
(74) *Attorney, Agent, or Firm* — Edward C. Kwok; Haynes and Boone, LLP

(57) ABSTRACT

A method automatically and efficiently propagates information using previously established social methods of communication (e.g., email, instant messaging (IM), social network message posting, and short message services). In conjunction with the method, a system collects and disseminates information on a social network. The system includes: (a) a server for providing a user interface (e.g., a user facing web site) which allows a user to exchange information with one or more external services, wherein the information exchange includes receiving a message from the user that the user intends to disseminate through the external services; (b) a message module which prepares the message received from the user for dissemination; and (c) a communication module coupled to the user interface, the message module and the external services to mediate the information exchange between the user and the external services.

60 Claims, 6 Drawing Sheets

METHOD FOR INFORMATION GATHERING AND DISSEMINATION IN A SOCIAL NETWORK

CROSS REFERENCE TO RELATED APPLICATIONS

The present application is related to and claims priority of copending U.S. provisional patent application ("Copending Application"), entitled "Method for Message Dissemination in an Instant Message", Ser. No. 60/795,137, filed on Apr. 25, 2006. The Copending Application is hereby incorporated by reference in its entirety.

BACKGROUND OF THE INVENTION

1. Field of the Invention

The present invention relates to an on-line method for information gathering and dissemination. In particular, the present invention relates to a self-optimizing social network which gathers and disseminates information among its members.

2. Discussion of the Related Art

Information is often held and communicated in inefficient ways. For example, an individual may have a spare item that he would like to be rid of, while a friend of his may need such an item. Often, the information that would result in both needs being met is not communicated. As another example, an individual may need tickets to a basketball game for a coming weekend, while the individual's uncle may have friends with room in their box seats that they are willing to share. The success of many internet web sites has been predicated on partially filling this "information gap." However, the first generation of internet web sites which attempt to solve this problem largely ignored the existing social structure in their respective approaches. More recently, a newer generation of web sites attempt to utilize a form of social structure; namely, passing information between a person and other individuals selected by the persons ("friends") Such an approach utilizes an existing social structure in a straightforward manner—i.e., the need and desire among friends to communicate. Examples of these web sites include those that allow photograph sharing, or those bulletin boards that allow requests for sharing items (e.g., a ticket).

What has not been explored to date is a methodology that blends the prior art approaches to spreading information with more automated, computer-driven, and analytical message propagation methods that make use of existing online methods of social interactions (e.g., email, instant messaging, short messages services, and social network postings).

SUMMARY

The present invention provides a method for automatically and efficiently propagating information using previously established social methods of communication (e.g., email, instant messaging (IM), social network message posting, and short message services).

According to one embodiment of the present invention, a system for collecting and disseminating information on a social network includes: (a) a server for providing a user interface (e.g., a user facing web site) which allows a user to exchange information with one or more external services, wherein the information exchange includes receiving a message from the user that the user intends to disseminate through the external services; (b) a message module which prepares the message received from the user for dissemination; and (c) a communication module coupled to the user interface, the message module and the external services to mediate the information exchange between the user and the external services.

In one embodiment, the communication module communicates with the external services through remote procedure calls. The external services may be an email service, an instant messaging services or a social network. In an instant messaging service, the message to be disseminated may be referenced in a user status displayed in connection with the instant messaging service. Alternatively, the message may be posted as a weblog or a posting on a public electronic message board of a social network.

In one embodiment, a message propagation module is provided for determining parameters related to message dissemination. The message propagation module may limit selected messages to be disseminated only for a predetermined period of time.

In one embodiment, a friend module is provided that supplies a relationship graph (e.g., a friends graph) which relates potential message recipients according to a social relationship. In that instance, the social relationship helps to formulate message propagation paths. The friends module keeps track of parameters indicative of predetermined relationships between the potential message recipients, such as a frequency of communication between two given potential message recipients.

In one embodiment, an economic module is provided that automatically optimizes the parameters related to message dissemination. The economic module may select message propagation paths based on an indicated level of importance in the message or costs of propagation. The user assigns resources to message propagation, such as a number of credit points or an amount of money. The economic module also provides incentives for assisting in propagating the message. The economic module may include a database which stores data collected for factors affecting message dissemination effectiveness. Such factors include one or more of: (a) data rating the importance of the message; (b) data provided from components of the system; (c) data relating to the relevance of the message; (d) data relating the closeness of the recipients; (e) data regarding the geographical proximity of the actors; (f) data regarding the user's past status messages; (g) relevant data regarding the message or the user; (h) data regarding the intrusiveness of the medium; (i) data regarding the duration of the posting; and (j) data regarding whether or not the user has a record of helping message propagation.

In one embodiment, metrics are applied to measure message dissemination effectiveness. Suitable metrics include one or more of: (a) a user satisfaction metric; (b) a user return rate; (c) a user stay metric; (d) a user conversion rate; (e) a message selection rate; and (f) an allocation of points.

In one embodiment, a widget module provides widgets on web pages for accessing the external services.

In one embodiment, a proxy-advertising system sends a message to be advertised in an external advertising server via an application program interface.

The present invention is better understood upon consideration of the detailed description below, in conjunction with the drawings.

BRIEF DESCRIPTION OF THE DRAWINGS

To facilitate correspondence among the figures, like elements in the figures are assigned like reference numerals.

DETAILED DESCRIPTION OF THE PREFERRED EMBODIMENTS

According to one embodiment, the present invention provides an information sharing service. On a user's behalf, the information sharing service accesses many ways at the user's disposal that propagates the user's message. In addition, the information sharing service uses the resources of the user's friends. In return, a user makes his own methods available for his friends to use in a like manner.

In addition, a system of the present invention tracks and analyzes messages to determine the recipients to whom the messages would be most useful. The result of the analysis may be used to determine how a message may be spread through a person's social internet. The system also analyzes and keeps track of those who have helped, and makes it easier for people to account properly for his helpers in the past (and therefore who are most likely to be helpful to them in the future). Since what is primarily being sought out here is the attention of other people, the system has access to an important finite resource—people's attention. Sometimes, in order to be efficient, a person must demonstrate that his message is important. A system of the present invention includes a component that allows people to pay, either in monetary terms, or with a point based system, to have their messages spread further than others. Thus, the system may be viewed in fact as an advertising system.

Figure 1:
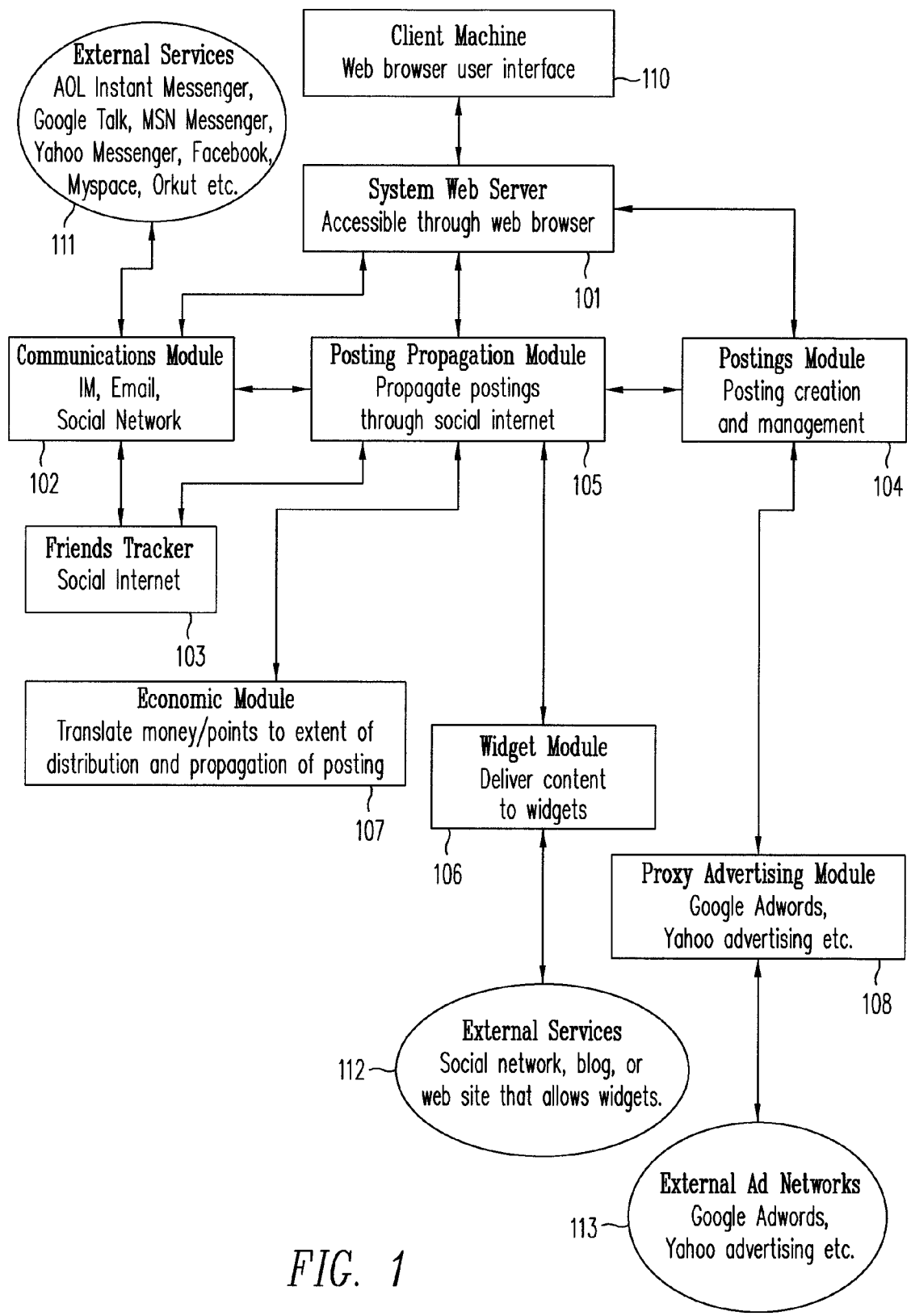
FIG. 1 shows major cooperative components of information sharing service 100, according to one embodiment of the present invention.

FIG. 1 shows major cooperative components of information sharing service 100, according to one embodiment of the present invention. As shown in FIG. 1, information sharing service 100 includes a user facing web site hosted by a web server 101, which is accessible through a conventional web browser. A web site is often the interface of choice for presenting the capabilities of the system to a user. However, other user interfaces, such as an application running on a desktop or a mobile device, may also be used.

Figure 2:
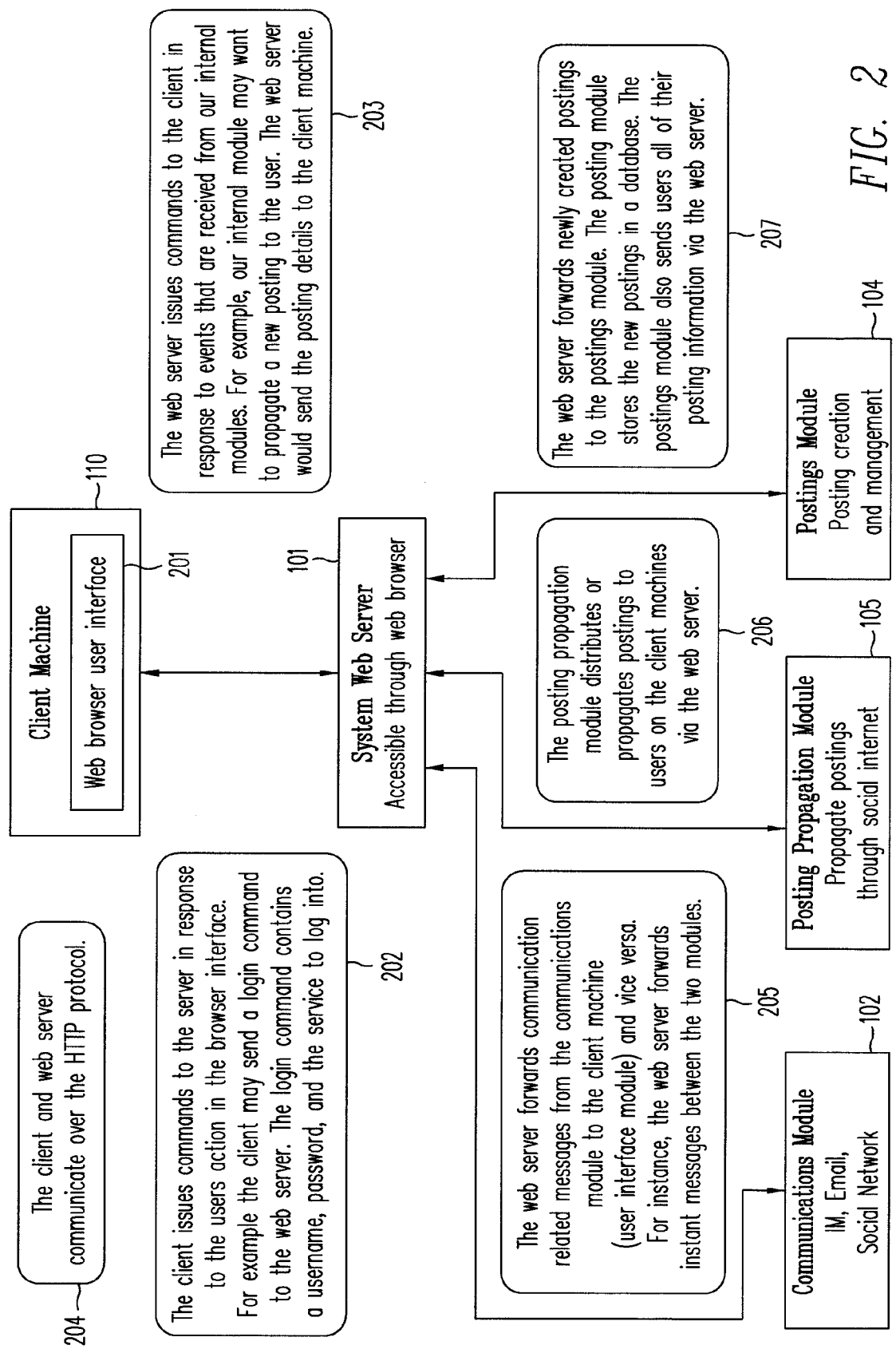
FIG. 2 shows in greater detail a client interacting with components of information sharing service 100 through web server 101 of FIG. 1.

FIG. 2 shows in greater detail a client interacting with components of information sharing service 100 through web server 101 of FIG. 1. Information sharing service 100 includes a browser-based user interface 201 running on a client machine. Modern browsers are powerful execution engines that not only display HTML, but also execute programs on behalf of the user. Such programs are often written in Javascript or Adobe's Flash languages, and allow the user to use a keyboard, mouse, or both to interact with text input boxes, pulldown menus, menus, and many of the other standard staples of graphical user interfaces. Using these technologies, browser-based user interface 201 may allow a user to give an explicit command, such as: "I am Bob and here is my password." The command may be relayed to web server 101 over HTTP, HTTPS or another suitable protocol (see comment 204 of FIG. 2). The web server relays the commands to the appropriate component of information sharing system 100.

The advantage of accessing services through a web site is compelling. Through a web browser, a client may issue, for example, commands (e.g., commands to log into a social network, as illustrated by comment 202 of FIG. 2). The client may also receive information from the user facing web site (e.g., a posting) when events occur in the internal components of information sharing service 100 (see comment 203).

Information sharing service 100 provides communication module 102 which allows the user to access other existing social systems 103. For example, communication module 102 provides support for a user (a) to communicate using email messages or instant message on various instant messaging networks, (b) to post on another's social interaction services (e.g., Myspace, or Facebook Wall), and (c) to exchange text messages with the user's phone contacts (e.g., over a short message service (SMS)). See comment 205 of FIG. 2. Communication module 102 allows the system to propagate messages ("postings") through these existing networks on the user's behalf. The collection of services and places to which a person may spread a message is referred in this detailed description as the person's "social internet." In this detailed description, the term "posting" is not limited to posting on a message board or a posting in a social interaction service, but may refer generally to any message, unless the context specifically requires.

Information sharing service 100 acts on a user's behalf in other online social systems through communication module 102. The term "social systems" refers to the set of services that people use on the internet (or electronically on the phone) in order to communicate with friends they have made either offline or online. Historically, these systems have included things like email systems and instant messaging systems. More recently, a newer set of services have emerged in this area including text messaging on cellular phones, and social network postings on sites such as Facebook or Myspace. In FIG. 2, the user at a client machine may cause posting to be made (see comment 207) and receive postings from posting propagation module 105, discussed in further detail below (See comment 206).

Information sharing service 100 utilizes services that are typically delivered on local networks and the Internet. A network-based service (e.g., the Google search engine) is typically delivered using multiple communicating, cooperative components (e.g., the user's web browser, web servers, application servers, and database servers). These components may communicate and exchange data, for example, over the TCP/IP protocol. TCP/IP refers to a popular conventional transport protocol for reliable communications. Other transport protocols may be used as well. A higher level protocol—hypertext transfer protocol (HTTP)—utilizes TCP/IP at the transport level to provide interaction between web browsers and web servers. HTTP is an example of a remote procedure call (RPC) mechanism, which is a simple request-response type data exchange protocol. Under HTTP, like most other RPC mechanisms, the request-response pair is more structured than the free-flow of information allowed under TCP/IP. Other RPC mechanisms are possible, and are in fact often used in communication between application servers, which typically run on a service provider's computers. In this detailed description, the term "RPC" encompasses mechanisms which are not as standardized as HTTP. While RPCs are extensively used in information sharing service 100, other possible RPC implementations may also be used.

As discussed above, a user facing component is provided as a web site, which allows the user to interact with information sharing service 100, and which controls how information sharing service interacts on the user's behalf. For example, at the web site, the user may enter a posting he or she wishes to spread, may view comments on its postings, and may comment on the postings of others. In order to make this service useful as a whole, information sharing service 100 provides capabilities that are seemingly not directly related to postings or to their propagation. For example, information sharing service 100 allows users to exchange emails or instant messages with their friends. The user facing component utilizes services of other components of information sharing service 100. Subcomponents of the user facing component include the web server, and a browser-based user interface.

Figure 4:
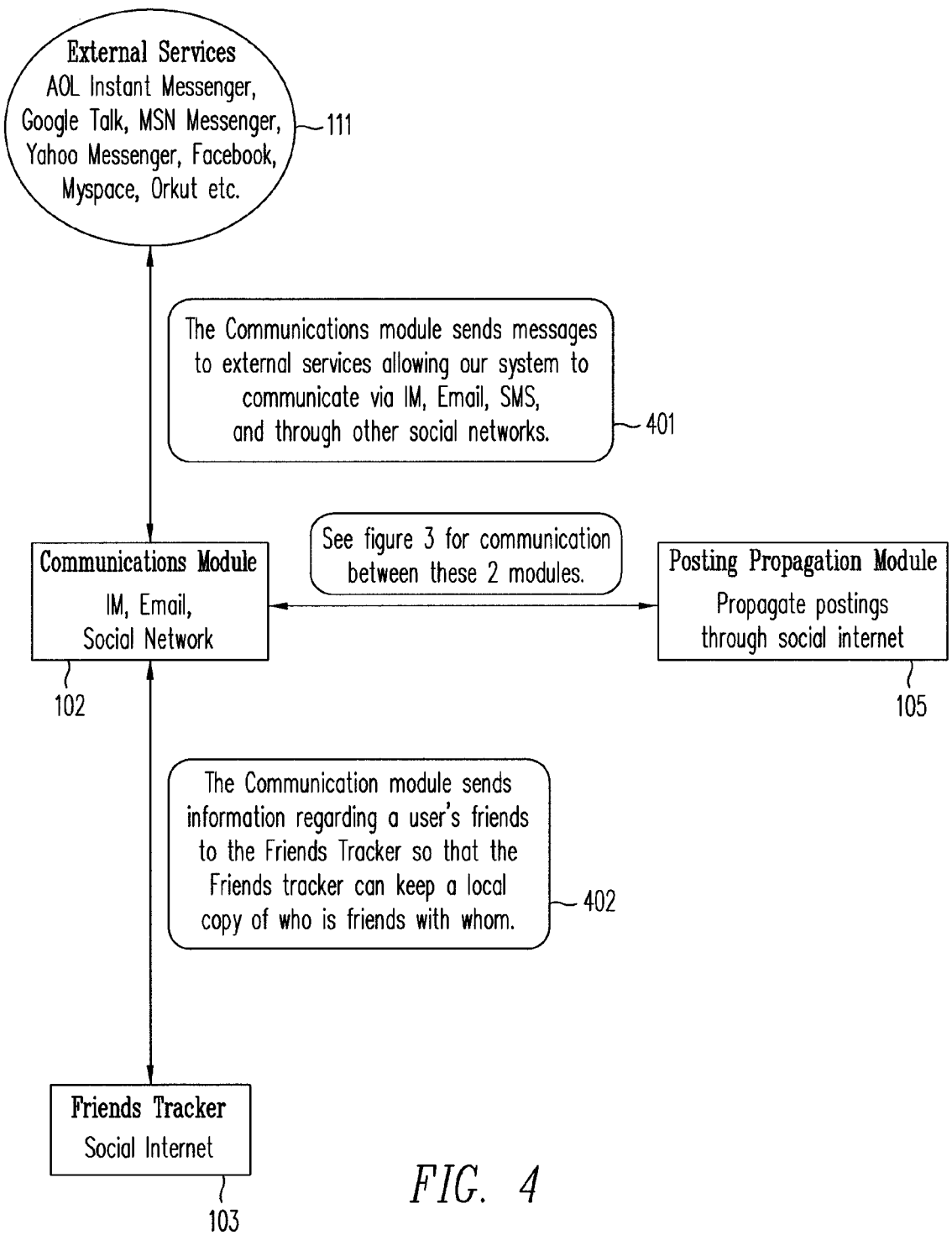
FIG. 4 shows in greater detail components of information sharing service 100 interacting with communication module 102 of FIG. 1.

Most users access the web using web browsers, which run on a user's computer or other access device, and which typically use the HTTP protocol to relay commands and receive responses from web services. Information sharing service 100 provides an HTTP service utilizing web server 101 to respond to browsers' HTTP commands. Web server 101 is typically merely an entry point into the services provided. To save a user's state, and to carry out a user's commands, other components of information sharing service 100 are typically engaged. FIG. 4 shows in greater detail components of information sharing service 100 interacting with communication module 102 of FIG. 1.

Figure 3:
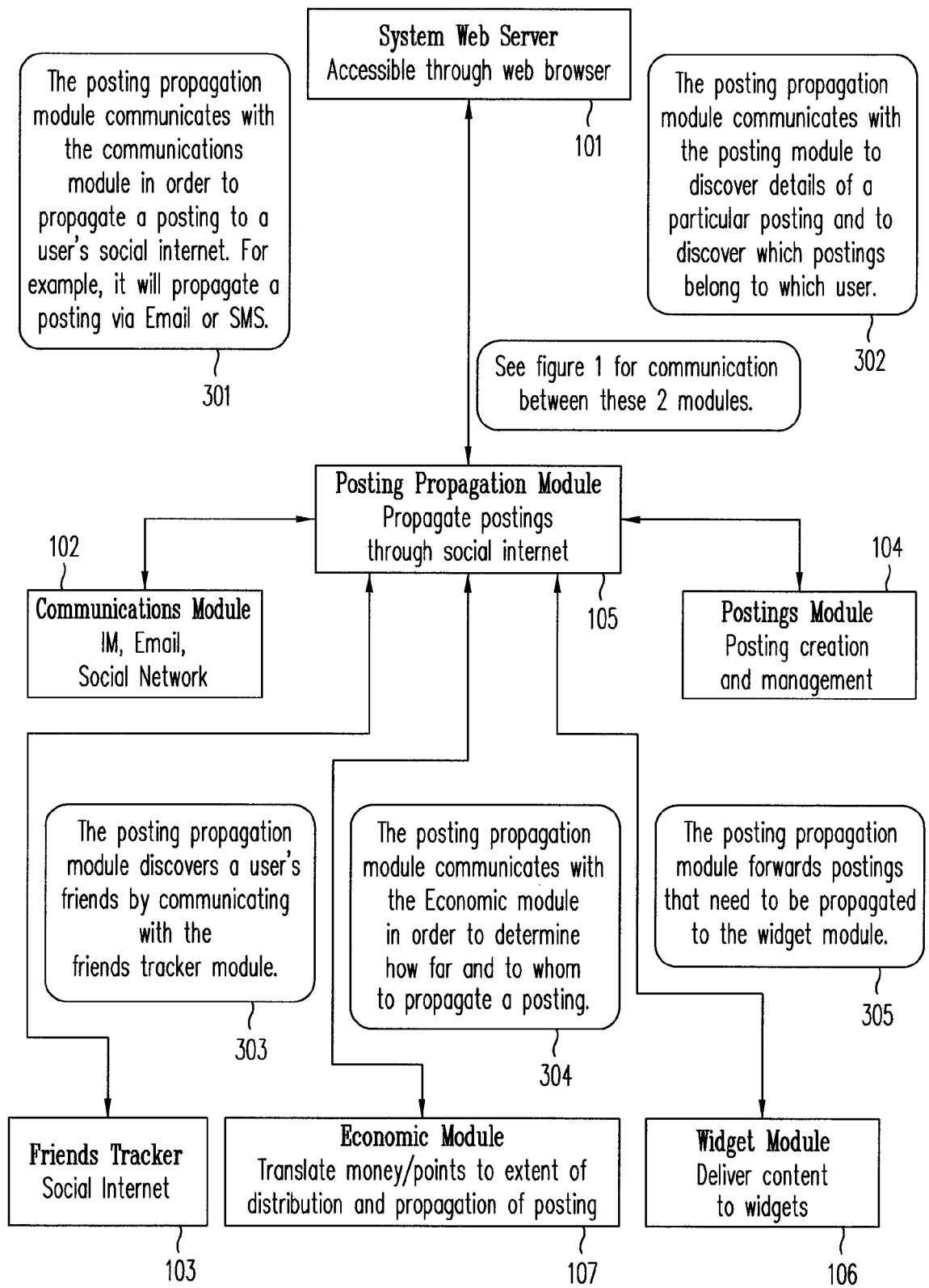
FIG. 3 shows in greater detail components of information sharing service 100 interacting with posting propagating module 105 of FIG. 1.

One application that illustrates these capabilities of communication module 102, is authenticating a user with other social systems to take advantage of capabilities in these social systems (e.g., making a posting via email, IM or SMS; see comment 401 of FIG. 3).

There are two parts to communication module 102, the back-end, which accesses and controls the accessed social systems, and the front-end, which interfaces with the user to determine the user's intention, which is then used by the back-end. The front end may be implemented substantially in the user facing web site and is described later in further detail. The back-end interacts with disparate systems, and is thus implemented by multiple subcomponents. Each subcomponent controls one or more of the social systems interacting with information sharing service 100.

One subcomponent controls instant messaging (IM) systems, which include such systems as AOL's instant messenger, MSN's messenger, Google's Talk network, Yahoo's IM network. Through IM systems, users may specify friends on each network, and after getting confirmation from such friends, users may instantly exchange messages when these friends are online. A user may display his or her IM status to his or her friends. These statuses inform about a user's current activity at the current time. For example, a user's status may say "Studying," which indicates that the user is studying, and therefore does not wish to be bothered during this time. IM statuses are an important part IM communication which maintains healthy functioning of these IM systems.

The subcomponent for interacting with IM systems ("IM subcomponent") may be implemented in a software server which runs on a machine connected to both the internet, and information sharing service 100's local network. The IM subcomponent interacts with the IM systems via an RPC mechanism to exchange command, control and other logistical information. This RPC mechanism in turn allows this subcomponent to be controlled by other components in information sharing service 100. The IM subcomponent connects to the instant messaging services and performs actions on those services on behalf of other components of information sharing service 100, which acts on behalf of its users.

The IM subcomponent establishes network links between itself and IM services using conventional methods, and the TCP/IP set of protocols, which dictate how various services communicate and exchange data with each other over the internet. A correct set of RPCs is required to be issued to the IM systems. As the nature of RPCs is not well established, and many different ways of implementing RPCs are used in practice, a portion of the subcomponent may be implemented using existing libraries, which provides both executable code and interface definitions. One example of such a library is the Pidgin Library, which allows and simplifies access to IM services.

The IM subcomponent also establishes listening network connections on the local network. These listening network connections receive and act on RPCs (and thus commands) from our other internal components such as the user interface, and other intermediate systems, and appropriately translate the commands into RPCs on the IM networks—and vice versa. For example, a command from another component may indicate that a user Bob intends to send the message "hi" to user Anne. In response, the IM subcomponent sends an RPC to the corresponding IM system to cause the message to be delivered to user Anne. As another example, a local RPC may be received that indicates that user Bob has set his status message to "working", an RPC is then sent to appropriate IM systems to set corresponding status messages to "working" for others on the IM systems. The IM subcomponent allows access to other capabilities of the IM systems (e.g., the ability to set a profile picture), and exposes such capabilities to other components on the local network.

One important function of the IM subcomponent is the proper authorization of users. For example, information sharing service 100 must authenticate each user. Typically, each IM service may authenticate its user via appropriate RPCs. Typically, the IM subcomponent makes an RPC to supply the user's username and password. The IM subcomponent exposes the authentication process of the IM services to the local network, so that the user facing interface, for example, may obtain the necessary authentication information for authentication with each IM service. An authentication module may be implemented to handle authentication services to the IM services and with other servers on the local network.

An analogous Email subcomponent accesses and controls email systems. As in the IM subcomponent, the Email subcomponent may be implemented as a software server connected to both the internet and the local network. The Email subcomponent connects to existing email services (e.g., Gmail, Yahoo mail, and Hotmail), and maintains listening connections on the local network, and exposes the capabilities of the remote email systems to components on the local network. Communication with the Email services is accomplished, as in IM services, through RPCs to accomplish such functions as checking a user's email messages, or sending an email message on behalf of the user. The email subcomponent receives local RPCs and acts on them. The Email subcomponent may share an authorization subsubcomponent with the IM services subcomponent.

Social networks (e.g., Facebook and Myspace) have emerged as large enablers of communications on the modern internet. Millions of users have accounts with these social network services, and use them to keep track of their friends' activities. A social network subcomponent allows a user partial control of other social network services through the user interface. The social network subcomponent is similar to the IM and Email subcomponents discussed above. Instead of using email or instant message services of the user, the social network subcomponent affects a user's profile, or post messages on behalf of the user, in a social network. The social network subcomponent connects to social networks and issue RPCs to the social networks to authenticate users, to change a user's profile, or to post messages in a user's public space or the public space of their friends. As in the Email and IM subcomponents, the social network subcomponent may have an authorization subsubcomponent which controls access to the social network services. Similarly, the social network subcomponent listens on the local network for RPCs.

Additional subcomponents may be incorporated for accessing other social services that a user may have access to. For example, a text messaging subcomponent may allow access to SMS services. As discussed above, all of these subcomponents of communication module 102 share common functionalities (e.g., to connect to internet services and to receive local RPCs).

Information sharing service 100 also includes friend tracking system 103, which keeps track of a user's "friends." As used in this detailed description, the term "friends" may encompass the user's friends in the offline world, "friends" that have been so identified on online systems (e.g., email systems, instant messaging systems, social network systems), names listed in an address book associated with the user's telephone, and any other persons with whom the user has actually communicated, or may potentially communicate. Information sharing service 100 uses the user's friends—and those who are reachable directly or indirectly through the friends of the user's friends—to propagate the user's postings. Friends may be grouped by specific social relationships (e.g., family, coworkers, and people with similar interests), by geographical locations, or any other suitable groupings.

Upon authenticating a user on a communication service (e.g., IM or social network), communication module 102 issues RPCs to retrieve information associated with the user's account. Communication module 102 exposes via RPC the user's list of friends on the system where he has been authenticated. The user's list of friends is then stored in a local database (See, comment 402 of FIG. 4). One way to store a user's friends is as tuple entries in the database, where each tuple includes: (a) the username of the user, (b) the service this user belongs to and (c) the username of the friend. The tuple entries can be updated as the user adds new friends or deletes existing friends.

From the information stored in the database, friend tracker module 103 generates a graph of the network of friends ("friends graph") across the different communication services to which the user belongs. The friends graph can be also used to determine mutual friends among users. For example, if user Bob is a friend of user Anne, and user Anne is a friend of user Charlie. The graph identifies user Anne as a mutual friend of users Bob and Charlie. The present invention uses identification of such connection types between friends to spread postings. Because information sharing service 100 associates a user's accounts across different communication services, friend tracker module 103 allows user Anne, who has accounts on services A and B, to relay posting information or messages to user Charlie on service A and to user Bob on service B.

Friend tracker module 103 stores additional information about a user's friends. For example, friend tracker module 103 may track which one of a user's friends (and on which service) the user communicates with the most. One implementation stores an additional field in the tuple to record the number of messages communicated to the corresponding friend. For certain communication systems (e.g., an IM service), information is stored about the user's current and past status messages (e.g., available, busy, or away) and his profile picture.

Information sharing service 100 includes posting module 104 which allows creating and keeping track of postings that the user wishes to propagate. Posting module 104 tracks every item that a user desires to propagate at any one time to optimize the use of the user's resources (e.g., its emails, instant messenger status messages, and social network postings). Information sharing service 100 supports interacting with a user's postings. For example, a viewer of a posting may view, comment and respond to the posting (e.g., choosing whether or not to help spread the user's posting). In addition, the user may specify the importance of a posting, review those who responded, or moderate comments on the posting.

Posting module 104 allows a user create new postings and manage existing postings through a user interface running on the user's client machine 110. The user may specify information regarding the posting, such as (a) a description of an item, including a tag line and a posting universal resource locator (URL) pointing to a web page ("posting page") with more information; (b) a duration for the posting; (c) an indication of how far the posting may be propagated (e.g., the total number of people the user wishes to reach, by a depth in the friends graph—reaching the friends of the user's friends—or by a geographic location); or an indication of the importance of the posting (e.g., how many points or an amount of money the user is willing to spend propagating or advertising the posting).

The tag line is a kind of title for the posting. An example of a short tag line is "I am selling my car." or "I need a ride to the airport on Friday". The posting page may be created automatically, which by default points to a page in information sharing service 100. The user can add additional and more detailed description of the posting to the page at the specified URL. For example, a user car seller may add a picture of the car, as well as detailed information about its mileage, last date of tune-up, and asking price. As another example, if the user wishes to propagate a posting about a new musician, a music video may be included on the posting page. The user can also post additional information such as preferred contact information. The posting page may also reside outside of information sharing service 100. The posting page allows other users to leave comments about the posting. For example, someone may leave the comment "I can give you a ride to the airport on Friday." or "Hey, I am interested in purchasing the car. Does it have a GPS system installed?".

When the user specifies a duration on the posting, posting module 104 determines an expiration time for propagating the posting. For example, certain postings (e.g., "I'm having drinks at the Miracle until midnight.") should propagate only for a few hours, while other postings (e.g., "We are hiring software engineers.") should be propagated for a few months. Alternatively, the user may specify no expiration date for a posting, which may deleted at a later time. To learn how far to propagate a posting in a friends network, posting module 104 may ask the user to specify a level of depth in the friends graph, or a number of people to reach. For example, a posting about a "small party at my place" may normally be deemed appropriate for the user's friends, or to a maximum of 50 interested people. In one embodiment, when a user specifies a depth of one (1), the posting is propagated to his friends only. Similarly, if the user specified a depth of two (2), the posting is propagated to the friends of his friends. In this manner, a level of three (3) propagate the posting to $3^{rd}$ degree friends (i.e., friends of the friends of the friends of the user). The user may use a geographic location limitation to indicate that the posting should only be propagated to people associated with a particular area (e.g., Boston). Geographical limitation is useful as some messages may have relevance only in the specified limited geographical area.

As discussed above, the user may specify an amount of money or points to spend on propagating the posting. The value indicates the importance of the posting and an appropriate amount of resources that should be allocated to propagate it. The user's specifications of the duration and the level of depth may also determine a required minimum amount of money or points. Further detail regarding this currency is described in further detail below in conjunction with economic module 107.

The user may view and manage all current and past postings through the user interface. When a current posting is deleted, posting module 104 causes propagation of the posting to cease. The user can also delete the posting page associated with the posting and moderate or disable commenting on the posting page. Posting module 104 collects statistics regarding the posting that can be analyzed for the effectiveness of the posting. For example, posting module 104 may provide statistics on the number of times a posting page was visited, as a function of the levels in the friends graph. A car sale posting, for example, may show 200 visits in the past 24 hours, in which 100 visits were from friends and 60 visits were from friends of friends. Based on the effectiveness of the posting, a user may adjust the tag line, the amount of propagation, the duration, and even the amount of money or points to spend on propagating the posting. A user can also track which user in his social internet have helped with propagating the posting, to understand which of his or her friends are helping out.

Whether a posting page was visited by a friend or a friend of a friend may be determined in a number of ways. Information sharing service 100 checks if the friend is logged into our system. Another way is to embed a different unique identifier in the query parameters of the posting page for each friend. Yet another method asks for contact information whenever a viewer visits the posting page. All information relating to a posting page can be stored locally in a database. One simple implementation stores in a table in which each row contains a posting identification and the stored information grouped together in fields. Other implementations are of course possible.

The user interface allows interacting with a user's postings. As discussed above, in one embodiment, a visitor of a posting page may view postings, comment on postings, or choose whether or not to help the poster in spreading their posting. To view a posting in a web browser, a user gets the URL of the posting page. The posting page is retrieved, which contains detailed information regarding the posting page, as well as comments made by users about the posting page. A user that is authenticated may post authenticated comments, whereas users that are not authenticated post unauthenticated or anonymous comments. Authenticated comments are displayed more prominently than unauthenticated comments. Users that are authenticated can post public comments that may be viewed by all visitors to the page, or private comments that may be viewed by a subset of other authenticated users. Unauthenticated users can only post public comments. When a comment is posted on the posting page, the comment is displayed on the page along with information about the user posting the comment, the time of day when the comment was posted and, for authenticated users, an optional image of the comment author.

Information sharing service 100 provides a method for a user to decide which friends the user may help with propagating a posting. A user may choose to help a friend on a particular posting, on all postings tagged with similar topics (e.g., all postings having the word "job" mentioned), some friends on all of their postings, all friends on all postings, or their extended social network. For each method, the user specifies the resources (e.g., IM, email, SMS) information sharing service 100 may use to spread the user's messages. These preferences can be stored in the database for other components (e.g., posting propagation module 105) to access.

Information sharing service 100 includes posting propagation module 105 which propagates postings. Posting propagation module 105 and posting module 104 together process messages as to both content and delivery. In some embodiments, their functions are performed by an integrated module. The term "message module" refers generally to the components that collectively perform message processing, such as those performed by posting propagation module 104 and posting module 105. In this system, a user may access resources (i.e., resources in the user's social internet) not only for propagating the user's own postings, but also the postings of the user's friends also. Posting propagation in posting propagation module 105 may be performed automatically, directed by both the users involved and the implemented algorithms. FIG. 3 shows in greater detail components of information sharing service 100 interacting with posting propagating module 105 of FIG. 1.

Once a user has created a posting in the system, the posting is ready to be propagated. Posting propagation module 105 communicates with posting module 104 to obtain the particulars of the posting to be propagated (see comment 302 of FIG. 3). The posting will be propagated through users who have agreed to make their resources available for propagation. This information is retrieved from friend tracker module 103 (see comment 303 of FIG. 3). In one embodiment, the cost of propagating the message is determined (see, for example, comment 304 of FIG. 3). Various incentives may be provided to the user to make resources available to others (e.g., credits that the user may use with his own postings, and recognition that the user is a helpful member of the user community). Incentives may be awarded in the form of points.

Propagation through IM systems is effectuated by setting a user's status to a message containing a tag line, posting URL, and the author associated with the posting. In addition a chain or friends path leading back to the original author of the posting may also be displayed. For example, consider user Anne who is a friend of user Bob, and user Bob is a friend of user Charlie. If user Anne has created a posting "I am looking for a dentist in Palo Alto", posting propagation module 105 would propagate the posting to Charlie's friends by setting Charlie's IM status to "Anne (Bob's friend) says: I am looking for a dentist in Palo Alto. http://imo.im/posting?id=12345". Posting propagation module 105 sets the status messages of users in the system to the details of another user's posting by making an RPC to the appropriate IM network (or by some other equivalent means) through communication module 102 (see comment 301 of FIG. 3).

Propagation through an Email system may also be achieved, using a method similar to the posting propagation method for IM systems discussed above, except that that an email is sent to user Charlie's friends on behalf of user Anne. Similarly, propagation in social networks may be implemented by displaying the posting information on a blog or on a public message board of the social network (e.g., the user's Wall on the Facebook). Propagation on other systems follows substantially the same model—e.g., an appropriate method is provided to communicate with the external communication system, the recipient of a posting is informed of the poster and the current relationship between the recipient and the poster, and details of the poster (e.g., how much the poster has helped other members of the community).

Posting propagation module 105 receives from friend tracking module 103 a list of the user's friends and the friends of the user's friends (comment 303). Posting propagation module 105 also receives from economic module 107 the types of communication systems to use to propagate a posting (determined, for example, based on costs[1]; see comment 304), the time for propagating, the level of the friends graph to propagate to, and other similar information.

[1] Propagating a posting via status messages, for example, may be less costly than propagating a message through SMS, because SMS is more intrusive.

Figure 5:
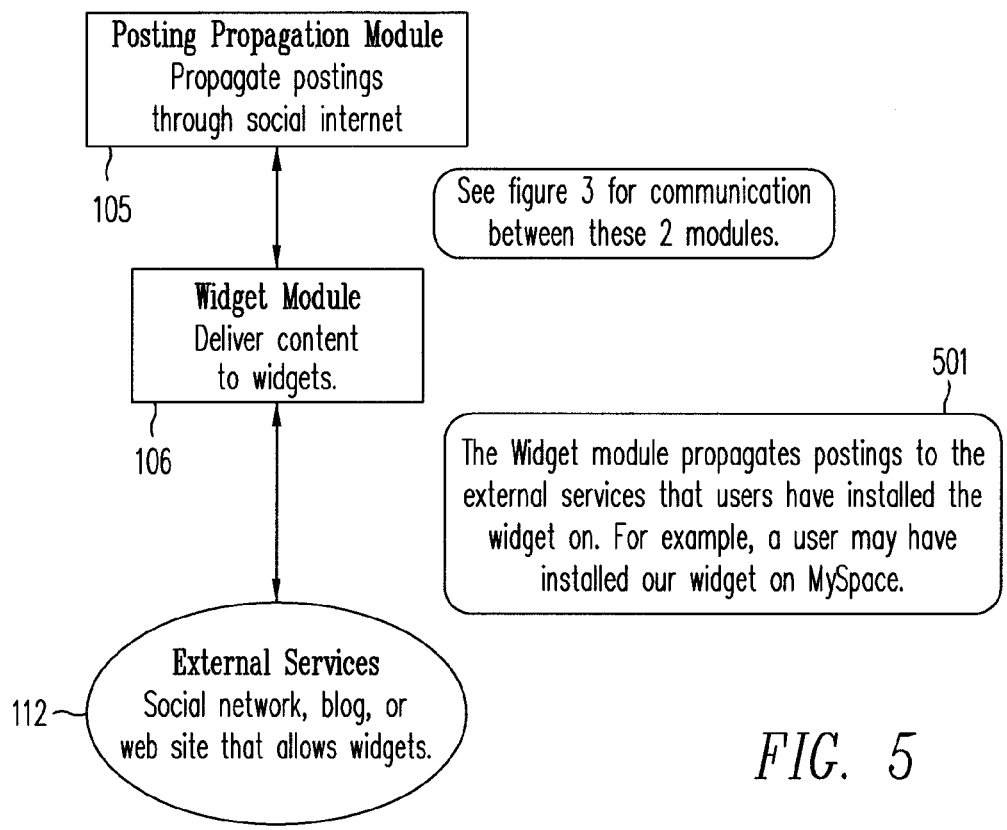
FIG. 5 shows in greater detail components of information sharing service 100 interacting with widget module 106 of FIG. 1.

Information sharing service 100 may develop, embed and distribute widgets on external web sites, such as social networking sites. As is known to those familiar with user interaction mechanisms on the internet, the term "widget" refers to a well-known mechanism by which a service provider may control a part of a user's web page (e.g., on a social networking web site) to provide access to its services. FIG. 5 shows in greater detail components of information sharing service 100 interacting with widget module 106 of FIG. 1.

In information sharing service 100, the widgets allow both the user and the user's friends to access their respective social internets from any place on the web. The widgets also allow information sharing system 100 to distribute and propagate postings to all the widgets distributed, based on friendships. (See. comment 305 of FIG. 3). Widgets (e.g., the YouTube widget or Slide widgets) have achieved widespread acceptance and use. Many widgets are written using javascript or the Adobe Flash language which is widely distributed in browsers. In one embodiment, widgets allow the user to access its social internet from an external site, and to distribute and propagate postings on other web sites (see, for example, comment 501 of FIG. 5). In one embodiment, a widget provides a list of postings in a users social internet. The postings are selected as described in economic module 107. For example, user Anne who has an account on a social network can install a widget from information sharing service 100 on her social network profile page. The widget can then display postings created by her friends in information sharing system 100. These widgets act as helpers, enabling a normal page to now be a host of a postings system, as well as the other services.

Figure 7:
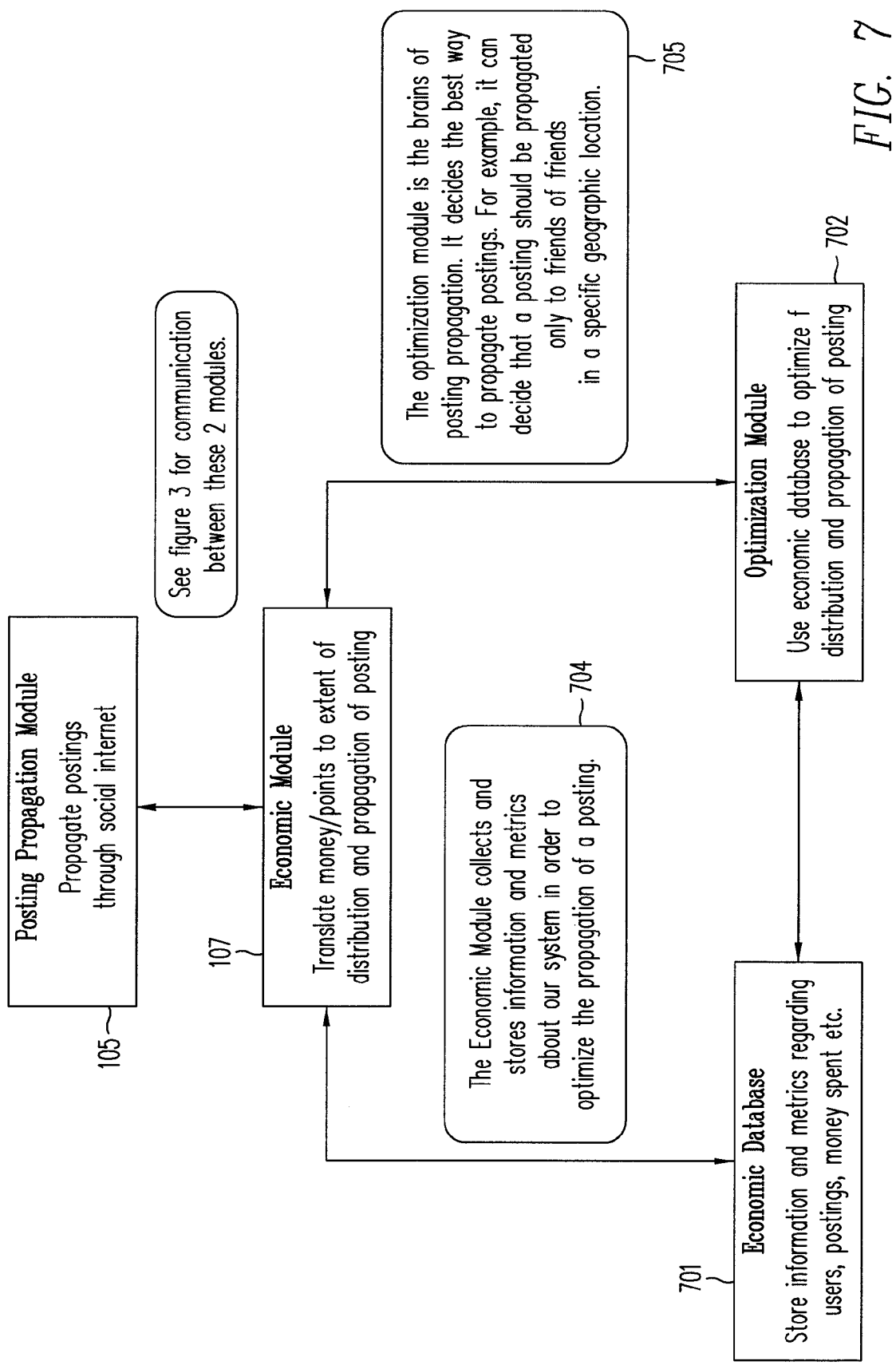
FIG. 7 shows in greater detail components of information sharing service 100 interacting with economic module 107 of FIG. 1.

Information sharing service 100 includes economic module 107 by which users can cooperate to exploit the social internets of all users, which is a finite resource which efficient use requires coordination. The combined social internet becomes the total attention paid to the social means of communications by all current participants. FIG. 7 shows in greater detail components of information sharing service 100 interacting with economic module 107 of FIG. 1.

Under economic module 107, a user may underscore the importance of his posting by paying for propagation, either through a point system (see, for example, the detailed description below regarding point allocation), or money (e.g., by credit card and ACH transfers). Information sharing service 100 thus includes many aspects of a conventional online advertising system (e.g., the receipt of payments and fraud detection).

Information sharing service 100 determines how to optimally use its various resources to help users communicate important information (postings) with each other. Optimization attempts maximize the value of the users' and their friends' time. For example, a user may be trying to get his friends to "come to my party tuesday night", while a friend of the user, Jane, may be trying to "find an appropriate bone marrow donor". A mutual friend Bob (of the user and Jane) may be preparing for final exams at a university. It may not be worthwhile for Bob to see the user's posting, while if Bob and Jane are compatible, Bob seeing Jane's posting may save Jane's life. Information sharing service 100 optimizes to make appropriate decisions.

To optimize, economic module 107 enlists a data collection subsystem, which includes economic data base 701 (see, FIG. 7). Data is collected from both user input and deduction made by economic module 107. Various kinds of data that are believed to be factors affecting performance may be stored, such as:

(a) data rating the importance of a posting (e.g., between a "pastime" to "life or death.");

(b) data provided from intermediate actors (e.g., user Bob may decide that he would help user Jane by spreading user Jane's message; user Bob's action indicates that the message is important to more people than just user Jane);

(c) data regarding the relevance of the posting, as deduced from information regarding the actors involved (e.g., Jane's posting may become more relevant to Bob if Bob and Jane share the same ethnicity as deduced by the data collection subsystem from a social network; on the other hand, a "party tonight" posting may become more relevant if Bob and Jane do not share ethnicities and Bob indicates "burned out" in his status message);

(d) data regarding the closeness of the actors involved (e.g., a user may have many friends on his "IM buddy list," but they are not equally close; in one embodiment, data collection subsystem gathers data regarding the relative frequencies of communication between the user and each of his friends, and uses the result data to prioritize the postings presented to the user to view);

(e) data regarding geographic proximity of the actors (e.g., a "party tonight" posting may be more relevant to people within the user's local area; data collection subsystem may deduce the local area from past responses to previous "party tonight" messages);

(f) data regarding the users' past status messages (e.g., a user may have had a status message "looking for a car" dated a few weeks ago, and if a friend of a friend—user Andy—is "selling a car", the car sale message may be of higher important to the user);

(g) relevant data about the poster or the post (e.g., if user Jane's post has been labeled "fraudulent" by 16 users by people who know Jane over a short period, the system may limit propagation of her posting; similarly, Jane's data may be collected from viewers of Jane's profile);

(h) data regarding the intrusiveness of the medium (e.g., for example, displaying a status message may be considered less intrusive than sending a user an email, which is in turn less intrusive than sending a text message (SMS); information sharing service 100 may forego sending a "party tonight" posting by SMS or email, choosing instead to use only IM status messages, while email, SMS and Voice over IP calls, and external advertising may all be used for a "life and death" posting);

(i) data regarding the duration of the posting (e.g., postings that are of shorter duration may be more appropriate to spread than postings referring to events happening far into the future); and (j) whether or not the user has helped the friend in the past (e.g., a user is more likely to help propagate a friend's message that she wants to "have dinner tomorrow", if the friend has helped the user in arranging dinners in the past by propagating the user's "I want to eat lunch now" messages).

Economic module 107 also measures the effectiveness of the propagation to be use for optimization of performance in optimization module 702 (FIG. 7). Various metrics for effectiveness can be used, such as:

(a) user satisfaction metrics—In one embodiment, user satisfaction is measured by the response to a question which asks if the user is happy to have been interrupted by a certain posting, or helped by it;

(b) user return rates—In another embodiment, a frequency of users returning to information sharing service 100 is correlated with how widely the messages were spread;

(c) user stay metrics—In another embodiment, an average stay times for users of information sharing service 100 is correlated with how well the system is functioning;

(d) user conversion rates—In another embodiment, where some features of a spreading posting are made available only to paying users (e.g., propagating beyond a $3^{rd}$ degree friends graph), performance is measured by the number of paying users;

(e) posting selection rate—In another embodiment, effectiveness is measured by how often the URL in the tag line is clicked on (i.e., selected) by a user in order to see the full posting;

(f) allocation of points—In another embodiment, where users are given points that can be given to others who help them, information sharing service 100 measures how often a user give away points and how many points are given away in total to correlate with the effectiveness of the system;

(g) any combination of the above metrics.

The data collected and the metric measurements in economic database 701 are used for optimization of performance in optimization module 702. (See, comment 704 of FIG. 7). Once a metric is adopted for evaluating the performance of the system, accurate data is collected for each showing of a posting. Optimization is achieved by economic module 107 analyzing how each factor contributes to the proper selection of the right posting to display at the right time (if any). For example, in one embodiment, each factor is given a positive or negative weight, and the total system health is measured by one of the metrics discussed above, normalized for the number of users, as appropriate. At regular time interval (e.g., daily), measurements are carried out in which the weights are changed and the health of the system is measured. Then, when a new set of weights is deemed to provide a higher health metric, that newer set of weights are used. Alternatively, the user base of information sharing service 100 may be divided into multiple groups, with each group given a different set of weights, and the health metrics are measured for each group. These techniques may be used to better determine what messages to share, when to share it, whether or not a posting should be propagated, and to which group of users the posting should be shared (e.g., to which level in the friends graph; see comment 703 of FIG. 7).

Another important element in the optimization process is the ability to demonstrate that a message is important to a user or group of users. Typically, in commerce, the willingness by a user to pay for a service demonstrates the importance in an economic way. Accordingly, in one embodiment, information sharing service 100 provides both a point system and a payment system in which users may participate to underscore the importance of their messages. For example, each user may be allocated 10 points to spend over the period of a month on their important messages. A user may share these points with or to give them to other people who help him. Alternatively, a user may purchase these points (or indicate the importance of their posts directly) monetarily. In another embodiment, a user may be rewarded from time to time with points for various desirable behaviors, such as helping a friend with a posting, or connecting a friend to another friend. In another embodiment, a user's point score is shown to others, to allow them to decide whether or not to help a user with a particular task.

All of these factors are weighed in economic module 107 to determine which resources to use, which people are selected to receive and interact with the postings, and what objectives may be achieved.

Figure 6:
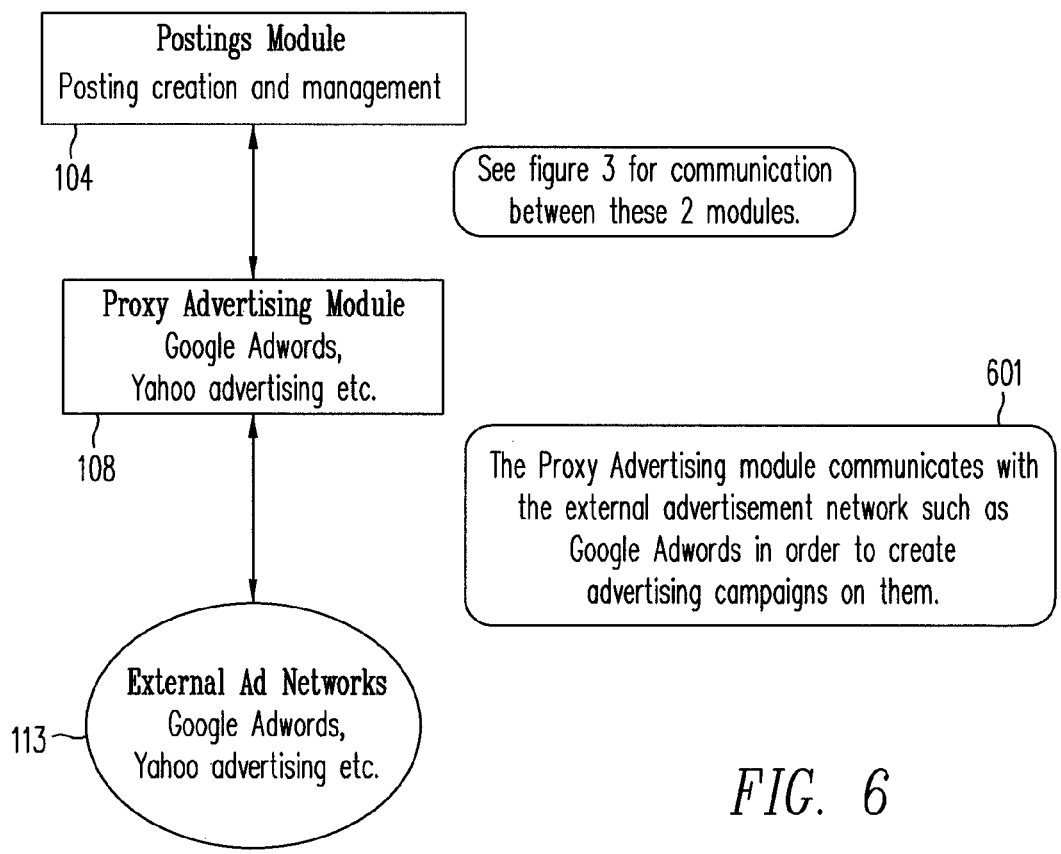
FIG. 6 shows in greater detail components of information sharing service 100 interacting with proxy advertising module 108 of FIG. 1.

Information sharing service 100 also includes proxy-advertising system 108. In some instances, a user's social internet may be insufficient to spread the user's posting efficiently to all its desired recipients. In these instances, information sharing service 100 allows a user to enhance propagation of his postings using traditional advertising on other online systems. Information sharing service 100 thus becomes the user's agent on existing systems such as Google's or Yahoo's advertising systems. FIG. 6 shows in greater detail components of information sharing service 100 interacting with proxy advertising module 108 of FIG. 1.

Proxy advertising system 108 allows the user to distribute and propagate his posting to external advertising systems (e.g., Google Adwords, Yahoo's advertising system, and any other third party advertising network 113). The users may advertise on external advertising networks through the user interface. In one embodiment, the user selects a checkbox labeled "Advertise on external networks" and an input field to specify how much money to spend on the external ad networks. Information sharing service 100 communicates with the external advertising networks via published application programming interfaces (APIs). See, for example, comment 601 of FIG. 6. The tag line of the posting, the duration of the posting, and the posting URL can then be used to generate an advertisement on these external ad systems. Furthermore, when an external system allows pictures or a larger amount of text, such information can be extracted from the posting page. When an external advertising system requires any field not found in the posting page, the user can be prompted for the additional information.

By default, information sharing service 100 selects the external advertising systems to advertise on. For instance, economic module 107 may decide to spend 40% of the available money on Google Adwords, 40% on Yahoo's advertising network and the remaining 20% on the Facebook's advertising network. Real-time adjustments may be made to the advertising system, depending on the effectiveness of the current fund distribution. Effectiveness can be measured in a variety of ways (e.g., a click through rate, or an action per click measurement). Alternatively, a user may manually control the proxy-advertising. For instance, a user may specifically select the advertising networks on which to distribute his posting, and the amount of money to spend to on each ad network.

Certain systems such as Google Adwords and Yahoo's advertising network request the advertiser to specify a list of keywords to be used to trigger a display of the advertisement. Information sharing service 100 automates keyword generation by analyzing the posting tag line and the text on the posting page. In one embodiment, the automatically generated keywords are generated by using all words in the posting page, except for such common words such as articles and conjunctions. In another embodiment, the user can modify the automatically generated list of keywords.

The above detailed description is provided to illustrate specific embodiments of the present invention and is not intended to be limiting. Numerous variations and modifications within the scope of the present invention are possible. The present invention is set forth in the following claims.

We claim:

1. A system for collecting and disseminating information on a social network, comprising:
    a server for providing a user interface which allows a user to exchange information with one or more external services, wherein the information exchange includes receiving a message from the user that the user intends to disseminate through the external services;
    a message module which prepares the message received over the user interface from the user for dissemination;
    a communication module coupled to the user interface, the message module and the external services, wherein the communication module interacts with the external services over a remote procedure call mechanism or a message passing mechanism to effectuate dissemination of the prepared message;
    a message propagation module for determining parameters related to message dissemination; and
    a friend module that provides a relationship graph relating potential message recipients according to a social relationship.

2. The system as in claim 1, wherein the user interface comprises a user facing web site.

3. The system as in claim 1, wherein the external services comprise one or more of an email service, an instant messaging service, a text message service, and a social network.

4. The system as in claim 3, wherein the external services comprise an instant messaging service and wherein the message to be disseminated is referenced in a user status displayed in connection with the instant messaging service.

5. The system as in claim 3, wherein the message is posted as a weblog or a posting on a message board.

6. The system as in claim 1, wherein the message module comprises a database for storing information used in preparing the message.

7. The system as in claim 1, wherein the message module allows the user to create, delete, view, comment on a posted message and determine whether or not to help propagate a posted message.

8. The system as in claim 1, wherein the message propagation module limits selected messages to be disseminated only for a predetermined period of time.

9. The system as in claim 1, wherein the message module takes advantage of the social relationship to formulate message propagation paths.

10. The system as in claim 9, wherein the relationship graph comprises a friends graph.

11. The system as in claim 1, wherein the friends module keeps track of parameters indicative of predetermined relationships between the potential message recipients.

12. The system as in claim 11, wherein the parameters comprise a frequency of communication between two given potential message recipients.

13. The system as in claim 4, further comprising an economic module that optimizes the parameters related to message dissemination.

14. The system as in claim 13, wherein the message to be disseminated is assigned a level indicative of importance, and wherein the economic module selects message propagation paths based on the indicated level of importance.

15. The system as in claim 14, wherein the user assigns resources to message propagation.

16. The system as in claim 15, wherein the resources assigned is expressed as a number of credit points or an amount of money.

17. The system as in claim 13, wherein the economic module provides incentives for assisting in propagating the message.

18. The system as in claim 13, wherein the optimization is performed automatically.

19. The system as in claim 13, wherein the economic module includes a database which stores data collected for factors affecting message dissemination effectiveness.

20. The system as in claim 19, wherein the factors include one or more of: (a) data rating the importance of the message; (b) data provided from components of the system; (c) data relating to the relevance of the message; (d) data relating the closeness of the recipients; (e) data regarding the geographical proximity of the actors; (f) data regarding the user's past status messages; (g) relevant data regarding the message or the user; (h) data regarding the intrusiveness of the medium; (i) data regarding the duration of the posting; and (j) data regarding whether or not the user has a record of helping message propagation.

21. The system as in claim 19, further comprising a module for applying a metric for measuring message dissemination effectiveness.

22. The system as in claim 21, wherein the metric comprises one or more of: (a) a user satisfaction metric; (b) a user return rate; (c) a user stay metric; (d) a user conversion rate; (e) a message selection rate; and (f) an allocation of points.

23. The system as in claim 13, wherein the economic module selects message propagation paths according to cost considerations.

24. The system as in claim 13, wherein the parameters related to message propagation comprise the recipient's time.

25. The system as in claim 1, further comprising a widget module, the widget module providing widgets on web pages for accessing the external services.

26. The system as in claim 1, further comprising a proxy-advertising system.

27. The system as in claim 26, wherein the proxy-advertising system sends a message to be advertised in an external advertising server via an application program interface.

28. The system as in claim 26, wherein the proxy-advertising system extracts information from the message and provides the information to one or more external advertisers.

29. The system as in claim 26, wherein the proxy-advertising system determines an allocation of resources among a plurality of external advertisers.

30. A method for collecting and disseminating information on a social network, comprising:
    providing a user interface which allows a user to exchange information with one or more external services, wherein the information exchange includes receiving a message from the user that the user intends to disseminate through the external services;
    preparing the message received over the user interface from the user for dissemination;
    interacting with the external services through a communication module over a remote procedure call mechanism or a message passing mechanism to effectuate dissemination of the prepared message;
    determining parameters related to message dissemination in a message propagation module; and providing a relationship graph is friend module that relates potential message recipients according to a social relationship.

31. The method as in claim 30, wherein the user interface comprises a user facing web site.

32. The method as in claim 30, wherein the external services comprise one or more of an email service, an instant messaging service, a text message service, and a social network.

33. The method as in claim 32, wherein the external services comprise an instant messaging service and wherein the message to be disseminated is referenced in a user status displayed in connection with the instant messaging service.

34. The method as in claim 32, wherein the message is posted as a weblog or a posting on a message board.

35. The method as in claim 30, wherein preparing the message comprises storing in a database information used in preparing the message.

36. The method as in claim 30, wherein the user interface allows the user to create, delete, view, comment on a posted message and determine whether or not to help propagate posted message.

37. The method as in claim 30, further comprising limiting selected messages to be disseminated only for a predetermined period of time.

38. The method as in claim 30, further comprising formulating message propagation path using the social relationship.

39. The method as in claim 38, wherein the relationship graph comprises a friends graph.

40. The method as in claim 30, further comprising keeping track of parameters indicative of predetermined relationships between the potential message recipients.

41. The method as in claim 40, wherein the parameters comprise a frequency of communication between two given potential message recipients.

42. The method as in claim 33, further comprising optimizing the parameters related to message dissemination.

43. The method as in claim 42, wherein the message to be disseminated is assigned a level indicative of importance, the method further comprising selecting message propagation paths based on the indicated level of importance.

44. The method as in claim 43, further comprising receiving from the user an assignment of resources for message propagation.

45. The method as in claim 44, wherein the resources assigned is expressed as a number of credit points or an amount of money.

46. The method as in claim 42, further comprising providing incentives for assisting in propagating the message.

47. The method as in claim 42, wherein optimizing is performed automatically.

48. The method as in claim 42, further comprising storing data collected for factors affecting message dissemination effectiveness.

49. The method as in claim 48, wherein the factors include one or more of: (a) data rating the importance of the message; (b) data provided from components of the system; (c) data relating to the relevance of the message; (d) data relating the closeness of the recipients; (e) data regarding the geographical proximity of the actors; (f) data regarding the user's past status messages; (g) relevant data regarding the message or the user; (h) data regarding the intrusiveness of the medium; (i) data regarding the duration of the posting; and (j) data regarding whether or not the user has a record of helping message propagation.

50. The method as in claim 48, further comprising applying a metric for measuring message dissemination effectiveness.

51. The method as in claim 50, wherein the metric comprises one or more of: (a) a user satisfaction metric; (b) a user return rate; (c) a user stay metric; (d) a user conversion rate; (e) a message selection rate; and (f) an allocation of points.

52. The method as in claim 42, further comprising selecting message propagation paths according to cost considerations.

53. The method as in claim 42, wherein the parameters related to message propagation comprise the recipient's time.

54. The method as in claim 30, further comprising providing widgets on web pages for accessing the external services.

55. The method as in claim 30, further comprising providing a proxy-advertising system.

56. The method as in claim 55, further comprising sending through the proxy-advertising system a message to be advertised in an external advertising server via an application program interface.

57. The method as in claim 55, further comprising extracting information from the message and provides the information to one or more external advertisers.

58. The method as in claim 55, further comprising determining an allocation of resources among a plurality of external advertisers.

59. The system of claim 1, wherein the message propagation module determines based on the parameters whether or not a message is to be disseminated.

60. The method of claim 30, further comprising determining, based on the parameters, whether or not a message is to be disseminated.

* * * * *